United States Patent [19]

Meadows

[11] 4,011,483

[45] Mar. 8, 1977

[54] GROUND WIRE MONITORING SYSTEM

[75] Inventor: Samuel K. Meadows, Piney View, W. Va.

[73] Assignee: The Ohio Brass Company, Mansfield, Ohio

[22] Filed: Nov. 7, 1974

[21] Appl. No.: 521,682

[52] U.S. Cl. .................................. 361/47; 324/51; 340/256; 361/107

[51] Int. Cl.² ...................... H02H 3/16; H02H 1/02

[58] Field of Search ............ 317/18 B, 18 C, 18 R, 317/18 D, 44; 324/51; 340/256

[56] References Cited

UNITED STATES PATENTS

| | | | |
|---|---|---|---|
| 2,999,189 | 9/1961 | Gerrard | 324/51 X |
| 3,196,316 | 7/1965 | Crom | 317/18 C |
| 3,335,324 | 8/1967 | Buckeridge | 317/18 C |
| 3,729,653 | 4/1973 | Mankoff et al. | 317/18 C |
| 3,746,929 | 7/1973 | Kotheimer | 317/18 C X |
| 3,852,641 | 12/1974 | Titus | 317/18 C X |
| 3,855,501 | 12/1974 | Agnew | 317/18 C |
| 3,886,409 | 5/1975 | Scarpino | 317/18 C |
| 3,891,894 | 6/1975 | Scarpino | 317/18 C |

Primary Examiner—J D Miller
Assistant Examiner—Patrick R. Salce
Attorney, Agent, or Firm—Bosworth, Sessions & McCoy

[57] ABSTRACT

A ground wire monitoring circuit particularly adapted for use in connection with mining machinery that is supplied with alternating current through a flexible cable from a power source remote from the machine. The cable contains phase conductors, a ground wire and a pilot wire. The ground wire is energized through the pilot wire from a voltage derived from the alternating current power supply at the remote source. Any failure of the pilot wire or ground wire is detected by circuit means adjacent the remote power source and in the event of such failure the power circuit leading to the machine is immediately opened. The power circuit is opened in the event of failure of the ground wire even though there may be low resistance parallel ground paths between the machine frame and the remote power source.

5 Claims, 1 Drawing Figure

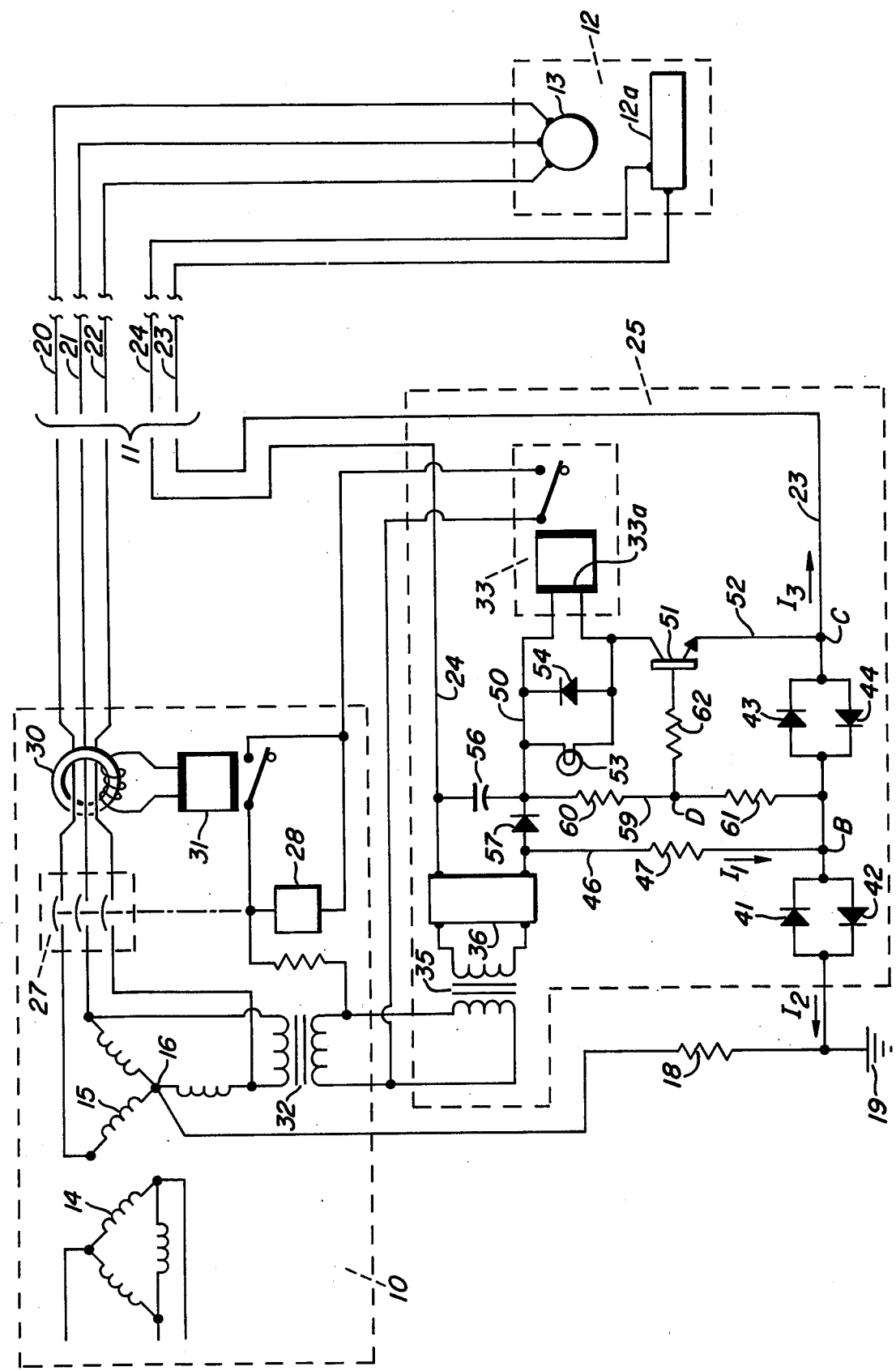

GROUND WIRE MONITORING SYSTEM

BACKGROUND OF THE INVENTION

This invention relates to a ground wire monitoring system for continuously checking the integrity of a grounding circuit of a machine operated by electric power and diposed at a distance from a power source. The apparatus is particularly adapted for use with an alternating current powered mining machine that is supplied by a flexible cable from a power source such as a transformer located in a power center that is remote from the machine.

Federal regulations require the use of such grounding circuits in connection with polyphase alternating current circuits that supply power to underground machines such as continuous coal mining machines. Grounding circuits conventionally include a ground conductor that extends along with the phase conductors in a flexible cable from the protective ground of a transformer at the power source to the frame of the machine. This circuit must include means for opening the circuit breaker at the power source immediately upon failure or breakage of the ground wire. This is essential to protect personnel from hazards that might arise due to failure of insulation in the machine or other fault and to prevent the machine frame from reaching a potential that could be dangerous to personnel who might be standing on the ground and touching the machine.

Ground wire monitoring circuits have been proposed in which the monitoring circuit has embodied a pilot wire that is utilized to complete a circuit with the ground wire in which a current is circulated. Failure of either the ground wire or the pilot wire is supposed to result in the opening of the circuit breaker leading to the machine. These systems present a hazard, however, for the reason that parallel paths for current to flow may exist between the machine frame through the ground to the remote power source. These incidental grounds, such as the machine frame resting on the earth, paths through pipe lines, mine track and conveyor frames and the like also help keep the machine frame at earth potential. But the resistance of these incidental grounds are variable quantities which, at the time of an electrical fault, may not be low enough to keep the machine frame from rising to a dangerous voltage above earth. Furthermore, the presence of the incidental parallel ground paths may prevent the usual ground wire monitoring circuit from opening the circuit breaker leading to the machine in the event that the ground wire is broken but the pilot wire remains intact.

Known pilot wire systems heretofore used, such as the system shown in U.S. Pat. No. 3,335,324, cannot distinguish between a current circulating through the pilot wire and the ground wire and a current circulating through the pilot wire and parallel ground paths between the machine frame and the power source, and thus may fail to operate because of the presence of the parallel paths even though the ground wire may be broken and even though the resistance of the parallel paths may not be low enough to maintain the voltage of the machine frame at a safe level above earth in the event of a serious fault. Furthermore, with prior types of devices the usual practice for checking correct operation of the monitor circuits is by temporarily opening the ground wire. If the relay opens when the ground wire is opened, this is an indication that the relay is operating correctly; but if the relay fails to open, this could mean either that the relay is not functioning correctly (it could be stuck or jammed) or that it is being held closed by current through low resistance parallel paths. The condition of the relay can be determined by temporarily opening the pilot wire. If the relay then drops open it is functioning correctly, but if low resistance parallel paths do exist there is no way, with these prior systems, to make sure that the ground wire is unbroken.

SUMMARY OF THE INVENTION

A general object of the present invention is the provision of an improved ground wire monitoring system that will function to detect a broken grounding conductor and open the circuit breaker for the power circuit leading to the machine whether or not stray parallel grounding paths are present. A further object is the provision of such a circuit in which the correct operation can be readily verified regardless of the presence or absence of stray parallel grounding paths.

Briefly, the foregoing and other objects and advantages of the invention are obtained by the provision of a ground wire monitoring system embodying a pilot wire and a ground wire extending from the frame of the machine to which power is supplied to the power source; the circuit including the pilot wire and the ground wire is energized with D.C. derived from the power source, the monitoring current being provided to the ground wire from a circuit that causes the current to divide into two portions, one portion returning to the current source by a path that includes the ground wire, the machine frame and the pilot wire, but not any stray parallel grounding paths, while the other portion returns to the current source by a path that includes the protective ground at the power source and any stray parallel grounding paths which may be present, there being current detecting means that is responsive only to the portion of the monitoring current that flows through the ground wire as distinguished from the stray parallel grounding paths. So long as the ground wire is intact, the flow of current through the ground wire maintains a ground wire monitor relay closed but if the ground wire is broken, the ground wire monitor relay drops out and the main circuit breaker is tripped to open the power circuit to the machine. This action takes place even though there may be a low resistance parallel ground path from the machine to the power source. Current flowing through such low resistance parallel paths is not effective to maintain the ground wire monitor relay closed when the ground wire circuit itself is open. Ordinarily, leakage or fault currents that might otherwise increase the voltage on the machine frame to a dangerous level can flow through the ground wire to the protective ground at the remote source in the usual manner, thus preventing the machine frame from reaching a dangerously high voltage. The functioning of the ground wire monitor system can be checked by opening the ground wire circuit as by disconnecting the ground wire from the machine frame, which will immediately result in the opening of the main circuit breaker if the monitor is operating correctly and this result is obtained whether or not there are stray parallel ground paths between the machine frame and the power source.

BRIEF DESCRIPTION OF THE DRAWINGS

The single FIGURE of the drawings is a circuit diagram of a preferred form of the invention.

DESCRIPTION OF THE PREFERRED EMBODIMENT

The drawing diagrammatically illustrates the present invention as adapted to a mine power system having a power source 10 connected by a flexible trailing cable 11 to a machine 12, such as a continuous mining machine having a frame 12a and embodying a motor 13 that is supplied with electric power from the power source 10 through the cable 11. As is usual in mine practice, the power source 10 may be considered as a portable sub-station and embodies a power transformer having a delta-connected primary 14 and a Y-connected secondary 15. The primary of the power transformer is connected to an external power source (not shown) and steps down the main voltage which may be, for example, from 2400 volts to 15,000 volts, to the voltage that is desired for operation of the machine 12; for example, 480 volts line to line or 277 volts line to ground. The neutral point 16 of the secondary 15 of the power transformer is connected to ground through a ground fault current limiting resistor 18 which, in accordance with usual practice, is designed to limit any ground fault current to about 25 amperes, this requiring a grounding resistor of 11 ohms in the example given. The resistor 18 is connected to a carefully constructed earth ground 19 that provides a good low resistance connection to earth.

The flexible cable 11, which supplies power to the machine 12 and which may be as much as 500 feet or more long, contains three phase conductors, 20, 21 and 22, leading from the transformer secondary 15 to the motor 13 of the machine 12, and a ground wire 23 and a pilot wire 24, both of which lead from the machine frame to the ground wire monitoring circuit indicated in general at 25, the ground wire being continued to the grounded end of the ground fault limiting resistor 18.

The power source also contains a conventional circuit breaker 26 interposed in the phase conductors 20, 21 and 22. The circuit breaker opens in the event of excessive current flow and also has an under-voltage release 28 of conventional construction. The power source also embodies a conventional current transformer 30 to detect ground faults and to operate a ground fault relay 3, that when closed shunts the coil of the under-voltage release 28 and results in the opening of the main circuit breaker 27. The coil of the under-voltage release is normally energized from the secondary of a transformer 32, the primary of which is connected across two of the windings of the secondary 15 of the power transformer.

The ground wire monitoring circuit 25 contains a ground wire monitor relay 33 which, as described more fully below, is maintained closed by the flow of current in the ground wire 23. The relay 33 drops open, thus interrupting the current to the coil of the circuit breaker under-voltage release 28, whenever current ceases to flow in the ground wire 23. In the absence of abnormalities in the system, the main circuit breaker can be reset whenever there is a current flowing in the ground wire since the transformer 32 is energized from the transformer secondary 15 in advance of the circuit breaker 27.

In order to provide a source of D.C. for circulation through the ground and pilot wires and for maintaining the ground wire monitor relay energized, the ground wire monitoring circuit 25 embodies a transformer 35, the primary of which is energized by the secondary of transformer 32. The low voltage, for example, 24 voltage output of the transformer 35, is rectified by a full wave rectifier 36 and in the embodiment shown the negative side of the rectifier output is connected to the pilot wire 24 and through the pilot wire to the frame 12a of the machine. The ground wire 23 extends from the machine frame back to the monitoring circuit 25 and leads to the grounded side of the resistor 18 through impedances preferably provided by two sets of diodes connected in inverse parallel, these being diodes 41 and 42 and 43 and 44. A connection to the positive output of the rectifier 36 is made through conductor 46 which is connected to point B on the ground wire between the two sets of diodes, a current limiting resistor 47 being incorporated in conductor 46. The resistor 47 serves to limit the current through the conductor 46 to about one-half ampere in the preferred form of the invention described herein.

In order to energize the ground wire monitor relay and maintain its contacts closed during normal operation of the system, the positive output of the rectifier 36 is connected through conductor 50 to the coil 33a of the relay 33 and then through transistor 51 and conductor 52 to the ground wire 23 at point C. So long as the transistor 51 is conducting and the ground wire is intact, current will flow through the coil of the relay 33 maintaining its contacts closed. If the current ceases to flow through the relay 33 for any reason, it will drop open and the under-voltage release of the main circuit breaker 27 will cause the circuit breaker 27 to open promptly. An indicator light 53 and a diode 54 are connected across the coil of the relay 33. The light is lighted whenever the coil is energized and the diode 54 protects transistor 51 from damage due to transients that may be developed by the coil of the ground wire monitor relay 33. A capacitor 56 is connected between the pilot wire 24 and the conductor 50, and a diode 57 is interposed in the conductor 50 between the point of connection of the conductor 46 and the point of connection of the capacitor 56 to the conductor 50. The diode 57 prevents discharge of the capacitor 56 through the conductor 46 and permits a smaller capacitor to provide satisfactory filtering.

In order to provide for control of the conduction of the transistor 51 another connection is made between the conductor 50 and the ground wire 23 from a point on the opposite side of the diode 57 from the rectifier 36 to a point between the point B and the diodes 43 and 44. This connection is made by a conductor 59 embodying resistors 60 and 61, a connection being made from a point D between the resistors 60 and 61 to the base of the transistor 51 through a resistor 62.

The operation of the monitoring circuit is as follows: The low voltage supply made up of the transformer 35 and rectifier 36 causes a monitoring current $I_1$ to flow through the current limiting resistor 47 to point B. Here the current divides into two portions: $I_2$ flows through the diode 42 to the protective ground then through the earth and any stray parallel ground paths to the machine frame and $I_3$ flows through diode 43 and the ground wire 23 to the machine frame. Here $I_2$ and $I_3$ combine and return to the rectifier 36 through the pilot wire 24.

$I_1$ is limited to about one-half ampere by resistor 47. While the value of $I_1$ is affected by variations in resistances of the ground wire, pilot wire and parallel paths, the ground wire and pilot wire resistances are normally only a few ohms and $I_1$ typically varies by no more than a ratio of about 2 to 1. $I_1$ provides a small, nearly constant voltage drop of about 0.6 volt across the diodes 42 and 43. Since there is a very low rate of change of diode forward voltage drop caused by forward current, the forward voltage drop across these diodes is typically constant within about five percent. The diodes 41, 42 and 43, 44 permit alternating current resulting from voltages appearing on the machine frame due to leakage in the machine insulation or other faults to flow to the protective ground 19 without imposing dangerous voltage levels on the machine frame or on the transistor 51 or other components of the monitoring system.

As mentioned above, in the present embodiment of the invention there is a forward drop of about 0.6 volt across diode 43. Values of resistors 60 and 61 are chosen so as to provide about an 0.4 volt drop across resistor 61. There is thus a drop of about 1 volt between point D and point C. This one volt is applied to resistor 62 that is in series with the base-emitter junction of transistor 51 and is sufficient to turn the transistor fully on, so that current can flow from the conductor 50 through the coil of the ground wire monitor relay, the transistor 51 and the ground and pilot wires back to the rectifier 36. This current flow causes the monitor relay 33 to pick up and the indicator lamp 53 to light. When the contacts of the monitor relay 33 are closed the circuit breaker 27 may be closed to supply power to the phase conductors 21, 21 and 22 leading to the machine.

If the ground wire breaks and there are no parallel ground paths between the machine frame and the ground 19, the relay 33 will drop out because its coil will be de-energized since the return path of the energizing current from the relay coil to the power supply 36 is opened. If there are low resistance parallel paths present when the ground wire breaks, the current from the relay 33 through the transistor 51 is forced to return to the power source by flowing through a series circuit made up of diode 44, diode 42, the protective ground 19, the stray parallel ground paths, the machine frame 12a and the pilot wire 24. The current flow through diode 44 applies a reverse bias of about 0.6 volt to diode 43. This makes point C and the emitter of transistor 51 about 0.6 volt more positive than point B. Since point D is about 0.4 volt positive with respect to point B, the base-emitter junction of transistor 51 is reverse biased by about 0.2 volt which turns off the transistor 51 and shuts off the current flow through relay 33 causing it to drop out, thereby opening the main circuit breaker 27 through the action of the under-voltage trip 28. Thus, the circuit breaker 27 will trip whether or not there are stray ground paths between the machine frame and the remote power source.

Since the presence of stray paths does not affect the correct operation of the monitoring system, operation can readily be verified by temporarily removing the connection between the ground wire and the machine frame or by otherwise opening the ground wire circuit.

From the foregoing, it will be evident that the invention provides a simple and effective ground wire monitoring circuit that is adapted for continuously checking the integrity of a grounding circuit of a machine such as a mining machine that is supplied with electric power from a power source remote from the machine. The operation of the system can be checked readily by opening the ground wire circuit and the system will open the main circuit breaker of the power supply upon any failure of the supply of power to the monitoring system and upon any failure of the ground wire or pilot wire whether or not there are parallel low resistance paths through ground between the frame of the machine and the system ground.

Those skilled in the art will appreciate that various changes and modifications can be made in the preferred form of the invention that is disclosed herein by way of example, all without departing from the teachings of the invention. The essential characteristics of the invention are defined in the appended claims.

I claim:

1. A ground wire monitoring circuit for a polyphase current power system comprising a power source having a transformer providing a system neutral point, a ground for the system to which said neutral point is connected, a ground fault current limiting resistor interposed between the neutral point and the system ground, phase conductors to transmit power to an electric power consuming apparatus having a frame, a ground wire extending from the frame of the apparatus to the power source and connected to the system ground, and a main circuit breaker for said phase conductors, said monitoring circuit comprising a pilot wire extending from the frame of the apparatus, a low voltage D.C. source at the power source for supplying a circulating current to said ground and pilot wires, one terminal of said D.C. source being connected to said pilot wire, circuit means for dividing said circulating current into a first part flowing through the ground wire to the machine frame and returning to the D.C. source through the pilot wire and a second part flowing through a segment of the ground wire to the system ground, then through any stray parallel ground paths that may be present to the machine frame and through the pilot wire to the D.C. source, and switching means responsive only to the first part of said circulating current and independent of any current that may flow through said stray paths for opening the system circuit breaker upon cessation of flow of said first part of said current.

2. A system according to claim 1 wherein the switching means comprises a transistor and circuit means for maintaining said transistor conductive so long as said first part of said circulating current is flowing and for biasing said transistor off whenever said first part of said circulating current ceases to flow while said second part of said circulating current continues to flow.

3. A ground wire monitoring system for a polyphase current power system comprising a power souce having a transformer providing a system neutral point, a ground for the system to which said neutral point is connected, a ground fault current limiting resistor interposed between the neutral point and the system ground, phase conductors to transmit power to an electric power consuming apparatus having a frame, a ground wire extending from the frame of the apparatus to the power source and connected to the system ground, and a main circuit breaker for said phase conductors, said system embodying a monitoring circuit comprising a low voltage D.C. source disposed at the power source for supplying a low voltage monitoring current from the power system, a pilot wire, one terminal of said monitoring D.C. source being connected to said pilot wire, said pilot wire extending to said machine frame, means connecting said ground wire to the other terminal of said D.C. source whereby the monitoring current can circulate through said pilot and ground wires so long as they are intact, a ground wire monitor relay having a coil responsive to flow of current in said ground wire, said ground wire monitor relay opening whenever the current supply to the coil thereof is shut off, circuits associated with said ground wire monitor relay for opening said main circuit breaker whenever the current supply to the ground wire monitor relay is cut off, and circuit means for cutting off the supply of current to said ground wire monitor relay whenever current ceases to flow in said ground wire, regardless of the presence or absence of low resistance paths parallel to said ground wire for current to flow between said ground for said system and said machine frame, the monitoring circuit including two impedances interposed in series in said ground wire, said impedances each being adapted to create substantially constant voltage drops in said ground wire, a connection, including current limiting means, from said D.C. source to said ground wire, the connection being made at a point on said ground wire between said impedances, a second circuit between said D.C. source and said ground wire, said second circuit being connected to said ground wire at a point between one of said impedances and the machine frame, said second circuit including the coil of said ground wire monitor relay and switching means for opening said second circuit whenever flow of monitoring current through said ground wire is interrupted.

4. A system according to claim 1 wherein said impedances each comprise a pair of diodes connected in inverse parallel.

5. A system according to claim 3 wherein the monitoring circuit includes two pairs of diodes connected in inverse parallel and connected in series in the ground wire, a first connection including a current limiting resistor from said low voltage D.C. source to a point on said ground wire between said pairs of diodes, a second circuit between said D.C. source connected to said ground wire at a point between one of said pairs of diodes and the machine frame, said second circuit including the coil of said monitoring current relay and electronic switching means comprising a transistor having its collector-emitter circuit in series with said coil, a voltage dividing circuit connected between said monitoring current supply means and a point between said pairs of diodes, and a connection between said voltage divider circuit to the base of said transistor whereby to bias said transistor on when current is flowing through said ground wire, and whereby the transistor is reverse biased and turned off in the event that the circuit through the ground wire is opened and there are stray parallel ground paths between the system ground and the machine frame.

* * * * *

UNITED STATES PATENT AND TRADEMARK OFFICE
CERTIFICATE OF CORRECTION

PATENT NO. : 4,011,483
DATED : March 8, 1977
INVENTOR(S) : Samuel K. Meadows

It is certified that error appears in the above-identified patent and that said Letters Patent are hereby corrected as shown below:

```
Column 3, Line 43, after "breaker" change "26" to --27--;
          Line 50, after "relay" change "3" to --31--.
Column 5, Line 33, after "conductors" change "21, 21
                   and 22" to --20, 21 and 22--.
```

Signed and Sealed this

Thirty-first Day of May 1977

[SEAL]

Attest:

RUTH C. MASON
*Attesting Officer*

C. MARSHALL DANN
*Commissioner of Patents and Trademarks*